US010665193B2

(12) United States Patent
Li et al.

(10) Patent No.: US 10,665,193 B2
(45) Date of Patent: May 26, 2020

(54) ARRAY SUBSTRATE COMPRISING SWITCH CONNECTED BETWEEN TWO ADJACENT SCAN LINES AND SWITCH DRIVE CIRCUIT, LIQUID CRYSTAL DISPLAY DEVICE, DISPLAY PANEL AND METHOD FOR DRIVING DISPLAY PANEL

(71) Applicants: BOE Technology Group Co., Ltd., Beijing (CN); Chengdu BOE Optoelectronics Technology Co., Ltd., Chengdu (CN)

(72) Inventors: Ting Li, Beijing (CN); Pengcheng Zang, Beijing (CN); Zhonglin Cao, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/981,000

(22) Filed: May 16, 2018

(65) Prior Publication Data

US 2019/0096351 A1 Mar. 28, 2019

(30) Foreign Application Priority Data

Sep. 28, 2017 (CN) .......................... 2017 1 0897360

(51) Int. Cl.
*G06F 3/038* (2013.01)
*G09G 3/36* (2006.01)

(52) U.S. Cl.
CPC ... *G09G 3/3677* (2013.01); *G09G 2300/0413* (2013.01); *G09G 2310/0216* (2013.01); *G09G 2310/08* (2013.01); *G09G 2320/0233* (2013.01)

(58) Field of Classification Search
CPC .................................................. G09G 3/3677
(Continued)

(56) References Cited

U.S. PATENT DOCUMENTS 6,124,840 A * 9/2000 Kwon .................. G09G 3/3677 345/100
7,978,274 B2 7/2011 Umezaki et al.
(Continued)

FOREIGN PATENT DOCUMENTS

CN 101539698 A 9/2009
CN 101963724 A 2/2011
CN 102136250 A 7/2011

OTHER PUBLICATIONS

Office Action, including Search Report, for Chinese Patent Application No. 201710897360.X, dated Nov. 15, 2019, 12 pages.

*Primary Examiner* — Adam J Snyder
(74) *Attorney, Agent, or Firm* — Westman, Champlin & Koehler, P.A.

(57) ABSTRACT

An array substrate, a display panel, a method for driving the display panel and a liquid crystal display device are disclosed. The array substrate includes: N rows of pixel units; N scan lines, each of the N scan lines corresponding to one of the N rows of pixel units, a switch is connected between two adjacent scan lines of the N scan lines; a scanning drive circuit configured to supply a scan activation signal to each of the N scan lines to activate a scan operation; a switch drive circuit configured to supply a drive signal to the switch between $i^{th}$ scan line and $(i+1)^{th}$ scan line in response to the scan activation signal of the $i^{th}$ scan line, to turn on the switch between the $i^{th}$ scan line and the $(i+1)^{th}$ scan line such that the $i^{th}$ scan line is in electrical communication with the $(i+1)^{th}$ scan line.

17 Claims, 7 Drawing Sheets

(58) Field of Classification Search
USPC ............................................................ 345/87
See application file for complete search history.

(56) References Cited

U.S. PATENT DOCUMENTS

| | | | | |
|---|---|---|---|---|
| 8,520,159 | B2 | 8/2013 | Umezaki et al. | |
| 8,531,366 | B2 | 9/2013 | Hu et al. | |
| 8,908,115 | B2 | 12/2014 | Umezaki et al. | |
| 8,957,839 | B2 | 2/2015 | Hu et al. | |
| 9,263,468 | B2 | 2/2016 | Umezaki et al. | |
| 9,606,408 | B2 | 3/2017 | Umezaki et al. | |
| 10,048,558 | B2 | 8/2018 | Umezaki et al. | |
| 10,527,902 | B2 | 1/2020 | Umezaki et al. | |
| 2004/0041763 | A1* | 3/2004 | Kodama .............. | G09G 3/3688 345/87 |
| 2008/0079001 | A1 | 4/2008 | Umezaki et al. | |
| 2009/0101912 | A1* | 4/2009 | Lin ...................... | G09G 3/3648 257/71 |
| 2009/0256832 | A1* | 10/2009 | Ding .................... | G09G 3/3677 345/211 |
| 2010/0109995 | A1* | 5/2010 | Fang .................... | G09G 3/3677 345/100 |
| 2010/0245301 | A1* | 9/2010 | Shang .................. | G09G 3/3677 345/204 |
| 2011/0018846 | A1 | 1/2011 | Hu et al. | |
| 2011/0260169 | A1 | 10/2011 | Umezaki et al. | |
| 2012/0154361 | A1* | 6/2012 | Wu ...................... | G09G 3/3677 345/211 |
| 2013/0321252 | A1 | 12/2013 | Hu et al. | |
| 2013/0341616 | A1 | 12/2013 | Umezaki et al. | |
| 2015/0077676 | A1 | 3/2015 | Umezaki et al. | |
| 2015/0339999 | A1* | 11/2015 | Zheng .................. | G09G 3/3677 345/92 |
| 2016/0005357 | A1* | 1/2016 | Cho ..................... | G09G 3/3677 345/78 |
| 2016/0141309 | A1 | 5/2016 | Umezaki et al. | |
| 2017/0176794 | A1 | 6/2017 | Umezaki et al. | |
| 2018/0182341 | A1* | 6/2018 | Imajo ................... | G09G 3/3677 |
| 2018/0348561 | A1 | 12/2018 | Umezaki et al. | |

* cited by examiner

ARRAY SUBSTRATE COMPRISING SWITCH CONNECTED BETWEEN TWO ADJACENT SCAN LINES AND SWITCH DRIVE CIRCUIT, LIQUID CRYSTAL DISPLAY DEVICE, DISPLAY PANEL AND METHOD FOR DRIVING DISPLAY PANEL

CROSS-REFERENCE TO RELATED APPLICATION

This application claims the priority benefit of the Chinese Patent Application No. 201710897360.X filed on Sep. 28, 2017 in the State Intellectual Property Office of China, the whole disclosure of which is incorporated herein by reference.

TECHNICAL FIELD

The present disclosure relates to the field of display, more particularly, to an array substrate, a display panel, a liquid crystal display device and a method for driving a display panel.

DESCRIPTION OF THE RELATED ART

In a display panel (such as liquid crystal display panel), pixel units are driven by gate scan lines to display. For a large-size display panel, gate signal lines (i.e., scan lines) have large load due to large size of the panel. A high resolution display panel has relatively short charging time due to high resolution.

SUMMARY

An embodiment of the present disclosure provides an array substrate, including:

N rows of pixel units, N being an integer greater than or equal to 2;

N scan lines, each of the N scan lines corresponding to one of the N rows of pixel units, a switch being connected between two adjacent scan lines of the N scan lines;

a scanning drive circuit configured to supply a scan activation signal to each of the N scan lines to activate a scan operation;

a switch drive circuit configured to supply a drive signal to the switch between $i^{th}$ scan line and $(i+1)^{th}$ scan line in response to the scan activation signal for the $i^{th}$ scan line, to turn on the switch between the $i^{th}$ scan line and the $(i+1)^{th}$ scan line such that the $i^{th}$ scan line is in electrical communication with the $(i+1)^{th}$ scan line, where i=1, 2, 3, . . . , N−1.

In some embodiments, the scanning drive circuit is further configured to supply a scan stopping signal to each of the N scan lines to stop the scan operation, and wherein the switch drive circuit is further configured to stop supplying the drive signal to the switch between $i^{th}$ scan line and $(i+1)^{th}$ scan line in response to the scan stopping signal for the $i^{th}$ scan line, to turn off the switch between the $i^{th}$ scan line and the $(i+1)^{th}$ scan line such that the $i^{th}$ scan line is disconnected with the $(i+1)^{th}$ scan line.

In some embodiments, the switch drive circuit includes:

a first clock signal supply terminal electrically connected with a drive terminal of the switch between $k^{th}$ scan line and $(k+1)^{th}$ scan line; and a second clock signal supply terminal electrically connected with a drive terminal of the switch between $j^{th}$ scan line and $(j+1)^{th}$ scan line, wherein k is an odd number greater than or equal to 1 but less than N, and j is an even number greater than 1 but less than or equal to N.

In some embodiments, the first clock signal supply terminal is configured to supply a drive signal to the drive terminal of the switch between the $k^{th}$ scan line and the $(k+1)^{th}$ scan line in response to the scan activation signal for the $k^{th}$ scan line such that the $k^{th}$ scan line is in electrical communication with the $(k+1)^{th}$ scan line, and wherein the second clock signal supply terminal is configured to supply a drive signal to the drive terminal of the switch between the $j^{th}$ scan line and the $(j+1)^{th}$ scan line in response to the scan activation signal for the $j^{th}$ scan line such that the $j^{th}$ scan line is in electrical communication with the $(j+1)^{th}$ scan line.

In some embodiments, the drive signal supplied by the first clock signal supply terminal and the drive signal supplied by the second clock signal supply terminal are out of phase.

In some embodiments, the switch drive circuit includes:

a first clock signal supply terminal electrically connected with a drive terminal of the switch between $(3p+1)^{th}$ scan line and $(3p+2)^{th}$ scan line;

a second clock signal supply terminal electrically connected with a drive terminal of the switch between $(3q+2)^{th}$ scan line and $(3q+3)^{th}$ scan line; and a third clock signal supply terminal electrically connected with a drive terminal of the switch between $(3r+3)^{th}$ scan line and $(3r+4)^{th}$ scan line, wherein p, q and r are integers greater than or equal to zero and meet:

$$3p+2 \leq N,$$

$$3q+3 \leq N, \text{ and}$$

$$3r+4 \leq N.$$

In some embodiments, the first clock signal supply terminal is configured to supply a drive signal to the drive terminal of the switch between the $(3p+1)^{th}$ scan line and the $(3p+2)^{th}$ scan line in response to the scan activation signal for the $(3p+1)^{th}$ scan line such that the $(3p+1)^{th}$ scan line is in electrical communication with the $(3p+2)^{th}$ scan line, wherein the second clock signal supply terminal is configured to supply a drive signal to the drive terminal of the switch between the $(3q+2)^{th}$ scan line and the $(3q+3)^{th}$ scan line in response to the scan activation signal for the $(3q+2)^{th}$ scan line such that the $(3q+2)^{th}$ scan line is in electrical communication with the $(3q+3)^{th}$ scan line, and wherein the third clock signal supply terminal is configured to supply a drive signal to the drive terminal of the switch between the $(3r+3)^{th}$ scan line and the $(3r+4)^{th}$ scan line in response to the scan activation signal for the $(3r+3)^{th}$ scan line such that the $(3r+3)^{th}$ scan line is in electrical communication with the $(3r+4)^{th}$ scan line.

In some embodiments, there is a phase difference of 120 degrees between the drive signal supplied by the first clock signal supply terminal and the drive signal supplied by the second clock signal supply terminal, and there is a phase difference of 120 degrees between the drive signal supplied by the second clock signal supply terminal and the drive signal supplied by the third clock signal supply terminal.

In some embodiments, one switch is electrically connected between each two adjacent scan lines of the N scan lines.

In some embodiments, the switch includes a transistor.

In some embodiments, the array substrate further includes a dummy gate signal line configured to apply a voltage to a first scan line of the N scan lines before the scan activation signal for the first scan line is supplied.

In some embodiments, the array substrate further includes a compensation resistor connected in parallel to a first scan line of the N scan lines.

An embodiment of the present disclosure provides a display panel including the array substrate as described above.

An embodiment of the present disclosure provides a liquid crystal display device including the display panel as described above.

An embodiment of the present disclosure provides a method for driving a display panel, the display panel including the array substrate as described above, the method including:

supplying a drive signal to a switch between $i^{th}$ scan line and $(i+1)^{th}$ scan line in response to a scan activation signal for the $i^{th}$ scan line, to turn on the switch between the $i^{th}$ scan line and the $(i+1)^{th}$ scan line such that the $i^{th}$ scan line is in electrical communication with the $(i+1)^{th}$ scan line, where $i=1, 2, 3, \ldots, N-1$.

In some embodiments, the method further includes:

stopping supplying the drive signal to the switch between $i^{th}$ scan line and $(i+1)^{th}$ scan line in response to a scan stopping signal for the $i^{th}$ scan line, to turn off the switch between the $i^{th}$ scan line and the $(i+1)^{th}$ scan line such that the $i^{th}$ scan line is disconnected with the $(i+1)^{th}$ scan line.

In some embodiments, the drive signal is supplied by a first clock signal supply terminal and a second clock signal supply terminal, the first clock signal supply terminal being electrically connected with a drive terminal of the switch between $k^{th}$ scan line and $(k+1)^{th}$ scan line, and the second clock signal supply terminal being electrically connected with a drive terminal of the switch between $j^{th}$ scan line and $(j+1)^{th}$ scan line, wherein k is an odd number greater than or equal to 1 but less than N, and j is an even number greater than 1 but less than or equal to N.

In some embodiments, the supplying the drive signal to the switch between $i^{th}$ scan line and $(i+1)^{th}$ scan line in response to the scan activation signal for the $i^{th}$ scan line includes:

supplying a drive signal to the drive terminal of the switch between the $k^{th}$ scan line and the $(k+1)^{th}$ scan line from the first clock signal supply terminal in response to the scan activation signal for the $k^{th}$ scan line such that the $k^{th}$ scan line is in electrical communication with the $(k+1)^{th}$ scan line, and supplying a drive signal to the drive terminal of the switch between the $j^{th}$ scan line and the $(j+1)^{th}$ scan line from the second clock signal supply terminal in response to the scan activation signal for the $j^{th}$ scan line such that the $j^{th}$ scan line is in electrical communication with the $(j+1)^{th}$ scan line.

In some embodiments, the drive signal is supplied by a first clock signal supply terminal, a second clock signal supply terminal and a third clock signal supply terminal, and wherein the first clock signal supply terminal is electrically connected with a drive terminal of the switch between $(3p+1)^{th}$ scan line and $(3p+2)^{th}$ scan line;

wherein the second clock signal supply terminal is electrically connected with a drive terminal of the switch between $(3q+2)^{th}$ scan line and $(3q+3)^{th}$ scan line; and wherein the third clock signal supply terminal is electrically connected with a drive terminal of the switch between $(3r+3)^{th}$ scan line and $(3r+4)^{th}$ scan line, wherein p, q and r are integers greater than or equal to zero and meet:

$$3p+2 \leq N,$$

$$3q+3 \leq N, \text{ and}$$

$$3r+4 \leq N.$$

In some embodiments, the supplying the drive signal to the switch between $i^{th}$ scan line and $(i+1)^{th}$ scan line in response to the scan activation signal for the $i^{th}$ scan line includes:

supplying a drive signal to the drive terminal of the switch between the $(3p+1)^{th}$ scan line and the $(3p+2)^{th}$ scan line from the first clock signal supply terminal in response to the scan activation signal for the $(3p+1)^{th}$ scan line such that the $(3p+1)^{th}$ scan line is in electrical communication with the $(3p+2)^{th}$ scan line, supplying a drive signal to the drive terminal of the switch between the $(3q+2)^{th}$ scan line and the $(3q+3)^{th}$ scan line from the second clock signal supply terminal in response to the scan activation signal for the $(3q+2)^{th}$ scan line such that the $(3q+2)^{th}$ scan line is in electrical communication with the $(3q+3)^{th}$ scan line, and supplying a drive signal to the drive terminal of the switch between the $(3r+3)^{th}$ scan line and the $(3r+4)^{th}$ scan line from the third clock signal supply terminal in response to the scan activation signal for the $(3r+3)^{th}$ scan line such that the $(3r+3)^{th}$ scan line is in electrical communication with the $(3r+4)^{th}$ scan line.

DETAILED DESCRIPTION OF EMBODIMENTS

Figure 1:
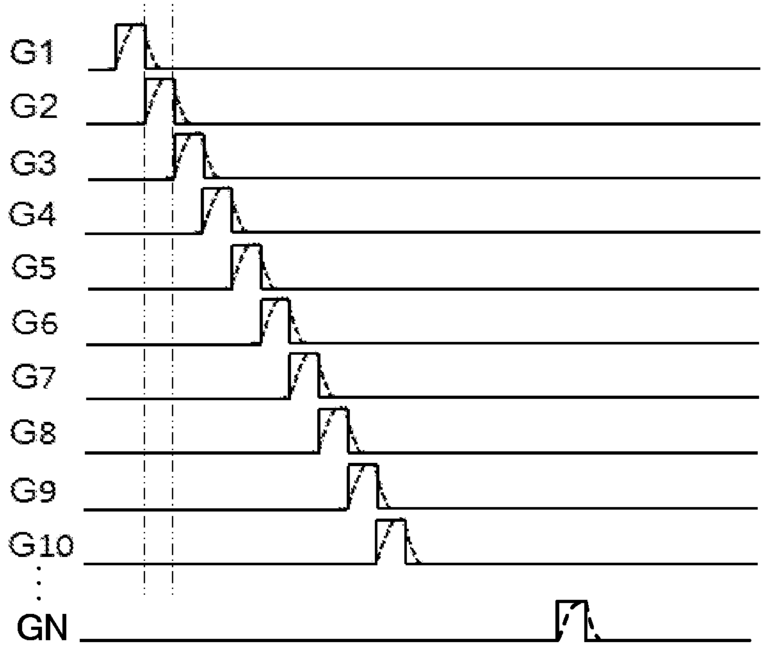
FIG. 1 is a schematic diagram showing a waveform of starting signals outputted from scan lines in an array substrate.

Embodiments of the present disclosure will be explained explicitly below. The exemplified embodiments are shown in figures. Throughout the description, same or similar reference numerals indicate same or similar elements or elements having same or similar functions. The following embodiments are described with reference to figures by ways of examples, instead of being limited to the present disclosure.

The array substrate, the liquid crystal display device, the display panel and the method for driving the display panel will be described below with reference to figures.

Inventors of the present application have found that there are serious signal delay effects in a relatively large size display panel due to large size of the panel, large loads of gate signal lines (i.e., scan lines). It can short real charging time to cause abnormal conditions such as uniform of pictures in the display panel. A high resolution display panel has gate signal line delay effects due to too high resolution and short charging time, thus the abnormal display caused by insufficient charging time will occur. FIG. 1 is a schematic diagram showing a waveform of a gate signal corresponding to a typical display panel. Solid lines in FIG. 1 are ideal waveforms outputted by the gate signal and dashed lines in FIG. 1 are real waveforms outputted by the gate signal. It can be seen that due to delay of the gate signal, the gate working time (peak time) is less than or far less than an ideal working time, to shorten the charging time, so as to cause non-uniformity of display of pictures due to insufficient charging.

Figure 2:
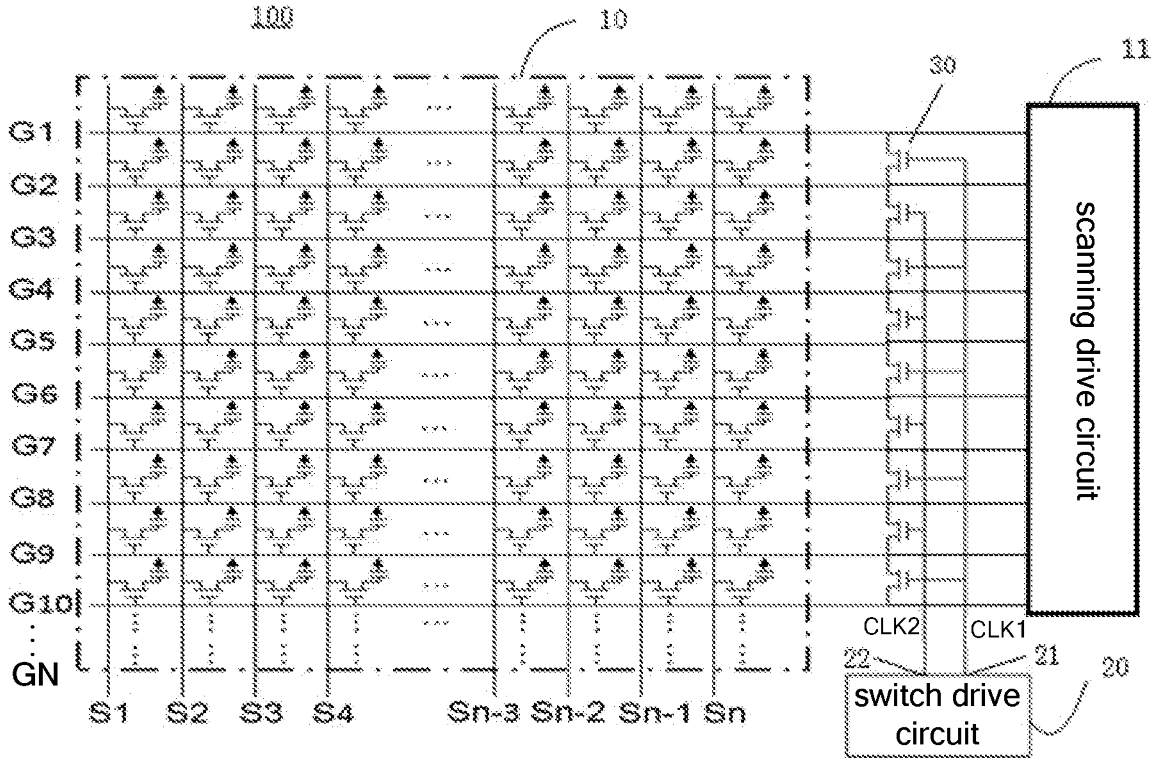
FIG. 2 is a schematic view showing a structure of an array substrate according to an embodiment of the present disclosure.
Figure 3:
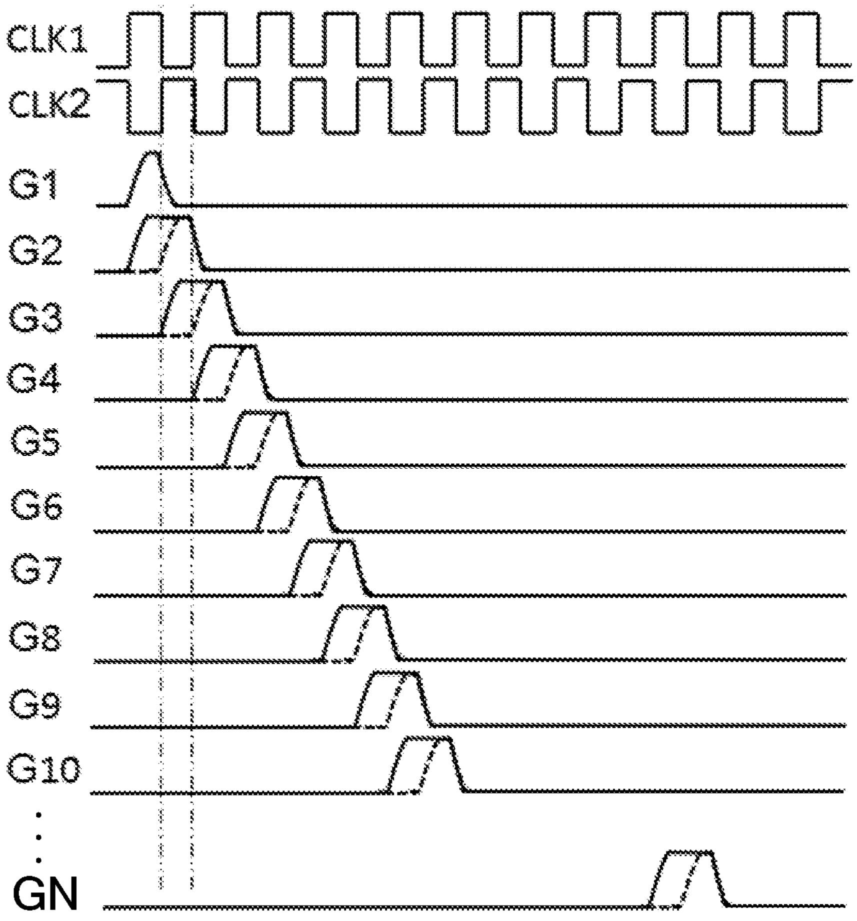
FIG. 3 is a schematic diagram showing waveforms of starting signals outputted from scan lines and a drive signal according to an embodiment of the present disclosure.

FIG. 2 is a schematic view showing a structure of an array substrate according to an embodiment of the present disclosure. As illustrated in FIG. 2, the array substrate 100 includes: N rows of pixel units 10, N scan lines G1 to GN (FIG. 3 shows G1 to G10) and a switch drive circuit 20. Each of the N scan lines corresponds to one of the N rows of pixel units 10, where N is an integer greater than or equal to 2. The array substrate 100 further includes a scanning drive circuit 11. The scanning drive circuit 11 is configured to supply a scan activation signal to each of the N scan lines to activate a scan operation.

In particular, as shown in FIG. 2, a switch (it is a transistor 30 in the example shown in FIG. 2) is connected between two adjacent scan lines of the N scan lines G1 to GN. The switch drive circuit 20 is configured to supply a drive signal to the transistor 30 between $i^{th}$ scan line and $(i+1)^{th}$ scan line in response to the scan activation signal of the $i^{th}$ scan line, to turn on the transistor 30 between the $i^{th}$ scan line and the $(i+1)^{th}$ scan line such that the $i^{th}$ scan line is in electrical communication with the $(i+1)^{th}$ scan line, where i=1, 2, 3, . . . , N−1. In this way, the $(i+1)^{th}$ scan line can output a starting signal earlier, in comparison with the array substrate without the above switch (transistor 30). That is, if the above switch (transistor 30) is absent, the $(i+1)^{th}$ scan line will not output the starting signal to the pixel unit until the scanning drive circuit 11 outputs the scan activation signal to the $(i+1)^{th}$ scan line. However, in an embodiment of the present disclosure, due to arrangement of the switch and the switch drive circuit 20, the $(i+1)^{th}$ scan line may output the starting signal in advance when the scanning drive circuit 11 outputs the scan activation signal to the $i^{th}$ scan line, so as to increase width of the outputted starting signal.

The array substrate can cause the scan lines to output the starting signal in advance. It is helpful to reduce the influence of the delay of scan lines on charging time of the display panel and avoid the abnormal display due to insufficient charging time of the display panel.

In the embodiment, the transistor between two adjacent scan lines may be a TFT (thin film transistor).

It can be understood that S1 to Sn shown in FIG. 2 are data lines.

As an example, the scanning drive circuit 11 may further be configured to supply a scan stopping signal to each of the N scan lines to stop the scan operation. The switch drive circuit 20 may further be configured to stop supplying the drive signal to the switch between $i^{th}$ scan line and $(i+1)^{th}$ scan line in response to the scan stopping signal of the $i^{th}$ scan line, to turn off the switch between the $i^{th}$ scan line and the $(i+1)^{th}$ scan line such that the $i^{th}$ scan line is disconnected with the $(i+1)^{th}$ scan line. It may avoid unnecessary communication between the $i^{th}$ scan line and the $(i+1)^{th}$ scan line to reduce system burden.

In an embodiment of the present disclosure, the switch drive circuit 20 includes: a first clock signal supply terminal 21 and a second clock signal supply terminal 22. The first clock signal supply terminal 21 is electrically connected with a drive terminal of the switch between $k^{th}$ scan line and $(k+1)^{th}$ scan line, where k is an odd number greater than or equal to 1 but less than N. The second clock signal supply terminal 22 is electrically connected with a drive terminal of the switch between $j^{th}$ scan line and $(j+1)^{th}$ scan line, where j is an even number greater than 1 but less than or equal to N.

As an example, the first clock signal supply terminal 21 is configured to supply a drive signal to the drive terminal of the switch between the $k^{th}$ scan line and the $(k+1)^{th}$ scan line in response to the scan activation signal of the $k^{th}$ scan line such that the $k^{th}$ scan line is in electrical communication with the $(k+1)^{th}$ scan line. The second clock signal supply terminal 22 is configured to supply a drive signal to the drive terminal of the switch between the $j^{th}$ scan line and the $(j+1)^{th}$ scan line in response to the scan activation signal of the $j^{th}$ scan line such that the $j^{th}$ scan line is in electrical communication with the $(j+1)^{th}$ scan line. In the example shown in FIG. 2, all of switches (transistors 30) are arranged in a column. The first clock signal supply terminal 21 may be configured to be connected with the drive terminals (for example gate electrodes) of all of odd rows of switches (transistors 30). The second clock signal supply terminal 21 may be configured to be connected with the drive terminals (for example gate electrodes) of all of even rows of switches (transistors 30).

In embodiments of the present disclosure, one switch may be arranged between adjacent scan lines, or a plurality of switches connected in series may be arranged between adjacent scan lines.

In an embodiment of the present disclosure, as shown in FIG. 2, one transistor 30 is arranged between adjacent scan lines, and the switch drive circuit 20 includes the first clock signal supply terminal 21 and the second clock signal supply terminal 22. The first clock signal supply terminal 21 is connected to the drive terminals of the odd transistors in the N−1 transistors 30 respectively. The second clock signal supply terminal 22 is connected to the drive terminals of the even transistors in the N−1 transistors 30 respectively. The first clock signal supply terminal 21 supplies a drive signal CLK1 when the odd scan lines receive the scan activation signal from the scanning drive circuit 11. The second clock signal supply terminal 22 supplies a drive signal CLK2 when the even scan lines receive the scan activation signal from the scanning drive circuit 11.

In particular, as shown in FIG. 3, the drive signal CLK1 supplied by the first clock signal supply terminal and the drive signal CLK2 supplied by the second clock signal supply terminal are out of phase, i.e., have opposite phases. On other words, when the drive signal CLK1 supplied by the first clock signal supply terminal is a first level, the drive signal CLK2 supplied by the second clock signal supply terminal will be a second level; or when the drive signal CLK1 supplied by the first clock signal supply terminal is the second level, the drive signal CLK2 supplied by the second clock signal supply terminal will be the first level. The first level is opposite to the second level, for example, the first level is a high level while the second level is a low level; or the first level is a low level while the second level is a high level.

In particular, as shown in FIG. 2 and FIG. 3, the first clock signal CLK1 corresponds to the scan activation signal of the odd scan lines while the second clock signal CLK2 corresponds to the scan activation signal of the even scan lines. When the scan activation signal of the first scan line G1 is triggered, the first clock signal supply terminal outputs the signal CLK1 of the high level to turn on the transistor between the first scan line G1 and the second scan line G2 to charge the second scan line G2 in advance, such that the second scan line G2 can output the starting signal in advance. At this time, the second clock signal supply terminal outputs the drive signal CLK2 of the low level. It will not interfere with the starting signal outputted by the third scan line G3. As such, when the second scan line G2 normally outputs the starting signal, the drive signal CLK2 outputted by the second clock signal supply terminal is the high level, to turn on the transistor between the second scan line G2 and the third scan line G3 to charge the third scan line G3 in advance such that the third scan line G3 outputs the starting signal in advance, and so forth. Thus, the scan lines G2 to GN can output the starting signal in advance.

Figure 4:
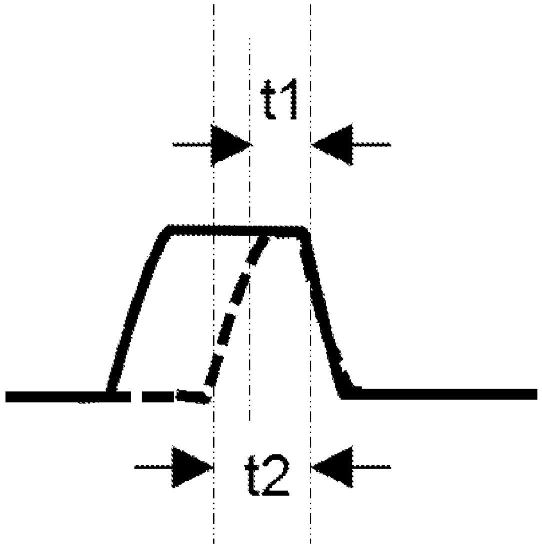
FIG. 4 is a schematic diagram showing a comparison between the starting signals outputted by the scan lines according to an embodiment of the present disclosure and those without switch.

Further, as shown in FIG. 4, solid lines represent waveforms corresponding to the starting signal outputted by the scan lines in the present disclosure; dashed lines represent waveforms corresponding to the starting signal outputted by the scan lines for the array substrate without the switch and the switch drive circuit; t1 represents real charging time of a display panel without the switch and the switch drive circuit; and t2 represents real charging time of a display panel according to the present disclosure. It can be seen from FIG. 4 that the array substrate according to the present disclosure can compensate the time reduced due to delay of scan lines (t2−t1), to greatly increase the charging time of the scan lines, such that influence of the delay of scan lines on the charging time of the display panel can be avoided and abnormal display caused by insufficient charging time can be avoided.

Figure 4A:
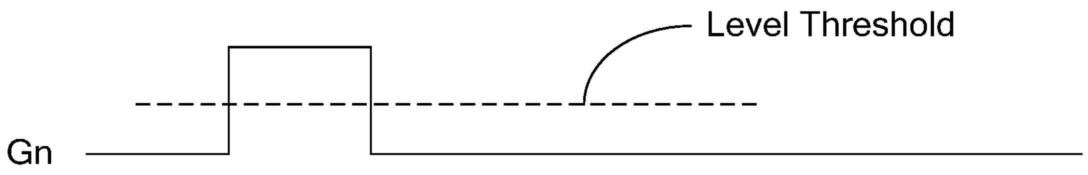
FIG. 4*a* is a schematic diagram showing an example of a signal outputted by a scanning drive circuit to the scan lines.

FIG. 4*a* gives a simple example of the scan activation signal and the scan stopping signal. This signal is outputted from the scanning drive circuit 11 to the scan lines. For example, only one pulse is used in an electrical level trigger mode. Then it can be assumed that a portion of the signal above a level threshold in FIG. 4*a* may be regarded as the scan activation signal while a portion of the signal below the level threshold may be regarded as the scan stopping signal. However, the scan activation signal and the scan stopping signal outputted by the scanning drive circuit to the scan lines in the embodiment of the present disclosure are not limited to this. All of the known various forms of gate control signals for controlling the scan operation to start or stop in the art are available.

In another embodiment of the present disclosure, the switch drive circuit 20 includes a first clock signal supply terminal 21, a second clock signal supply terminal 22 and a third clock signal supply terminal 23. The first clock signal supply terminal 21 is electrically connected with a drive terminal of the switch between $(3p+1)^{th}$ scan line and $(3p+2)^{th}$ scan line. The second clock signal supply terminal 22 is electrically connected with a drive terminal of the switch between $(3q+2)^{th}$ scan line and $(3q+3)^{th}$ scan line. The third clock signal supply terminal 23 is electrically connected with a drive terminal of the switch between $(3r+3)^{th}$ scan line and $(3r+4)^{th}$ scan line. p, q and r are integers greater than or equal to zero and meet: $3p+2 \leq N$, $3q+3 \leq N$, and $3r+4 \leq N$, where N is total number of the scan lines. It provides the solution of driving the switch using three clock signals.

As an example, the first clock signal supply terminal 21 is configured to supply a drive signal to the drive terminal of the switch between the $(3p+1)^{th}$ scan line and the $(3p+2)^{th}$ scan line in response to the scan activation signal of the $(3p+1)^{th}$ scan line such that the $(3p+1)^{th}$ scan line is in electrical communication with the $(3p+2)^{th}$ scan line. The second clock signal supply terminal 22 is configured to supply a drive signal to the drive terminal of the switch between the $(3q+2)^{th}$ scan line and the $(3q+3)^{th}$ scan line in response to the scan activation signal of the $(3q+2)^{th}$ scan line such that the $(3q+2)^{th}$ scan line is in electrical communication with the $(3q+3)^{th}$ scan line. The third clock signal supply terminal 23 is configured to supply a drive signal to the drive terminal of the switch between the $(3r+3)^{th}$ scan line and the $(3r+4)^{th}$ scan line in response to the scan activation signal of the $(3r+3)^{th}$ scan line such that the $(3r+3)^{th}$ scan line is in electrical communication with the $(3r+4)^{th}$ scan line.

Figure 5:
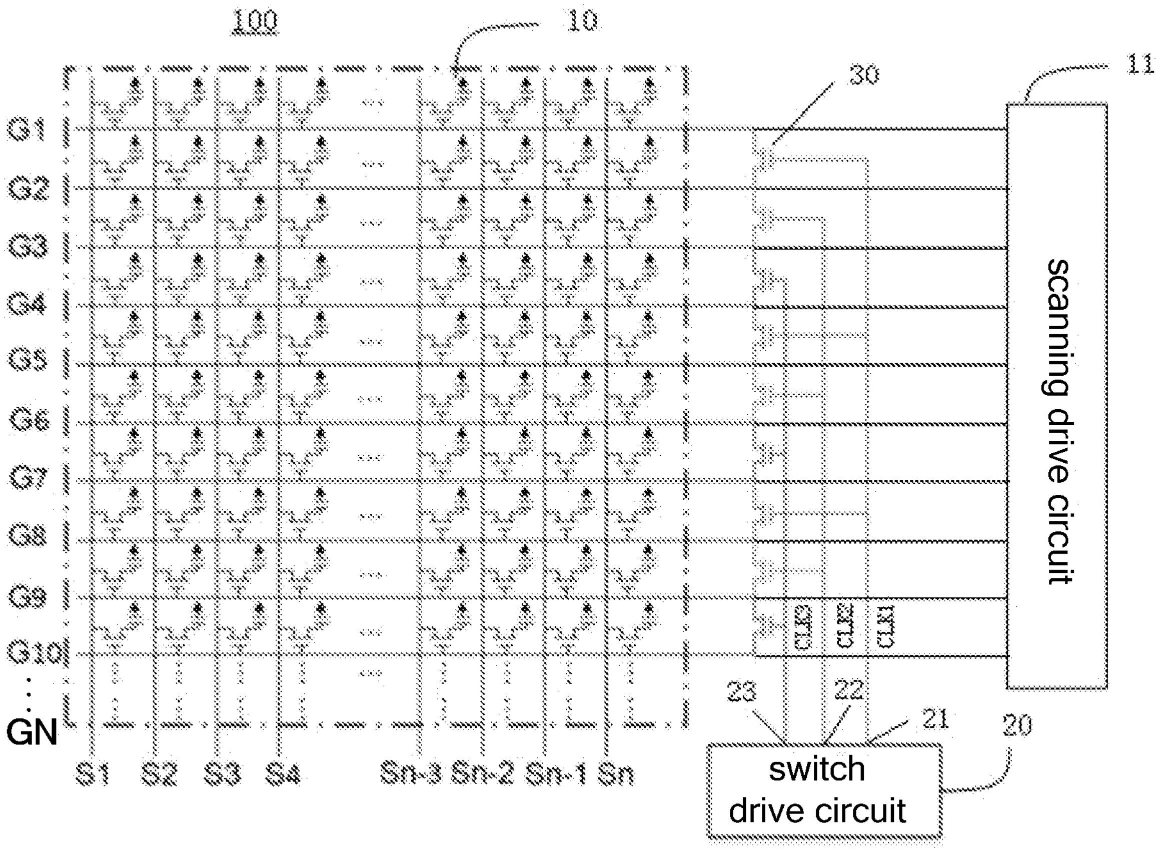
FIG. 5 is a schematic view showing a structure of an array substrate according to another embodiment of the present disclosure.

In another embodiment of the present disclosure, as shown in FIG. 5, the switch drive circuit 20 includes the first clock signal supply terminal 21, the second clock signal supply terminal 22 and the third clock signal supply terminal 23. The first clock signal supply terminal 21 is electrically connected with the drive terminals of the $(3m-2)^{th}$ transistors 30 in the N−1 transistors 30 respectively. The second clock signal supply terminal 22 is electrically connected with the drive terminals of the $(3m-1)^{th}$ transistors 30 in the N−1 transistors 30 respectively. The third clock signal supply terminal 23 is electrically connected with the drive terminals of the $(3m)^{th}$ transistors 30 in the N−1 transistors 30 respectively. The first clock signal supply terminal 21 is configured to supply the drive signal CLK1 when the scan activation signal of the $(3m-2)^{th}$ scan line in the N scan lines is triggered. The second clock signal supply terminal 22 is configured to supply the drive signal CLK2 when the scan activation signal of the $(3m-1)^{th}$ scan line in the N scan lines is triggered. The third clock signal supply terminal 23 is configured to supply the drive signal CLK3 when the scan activation signal of the $(3m)^{th}$ scan line in the N scan lines is triggered. In the above embodiment, m is a positive integer.

Figure 6:
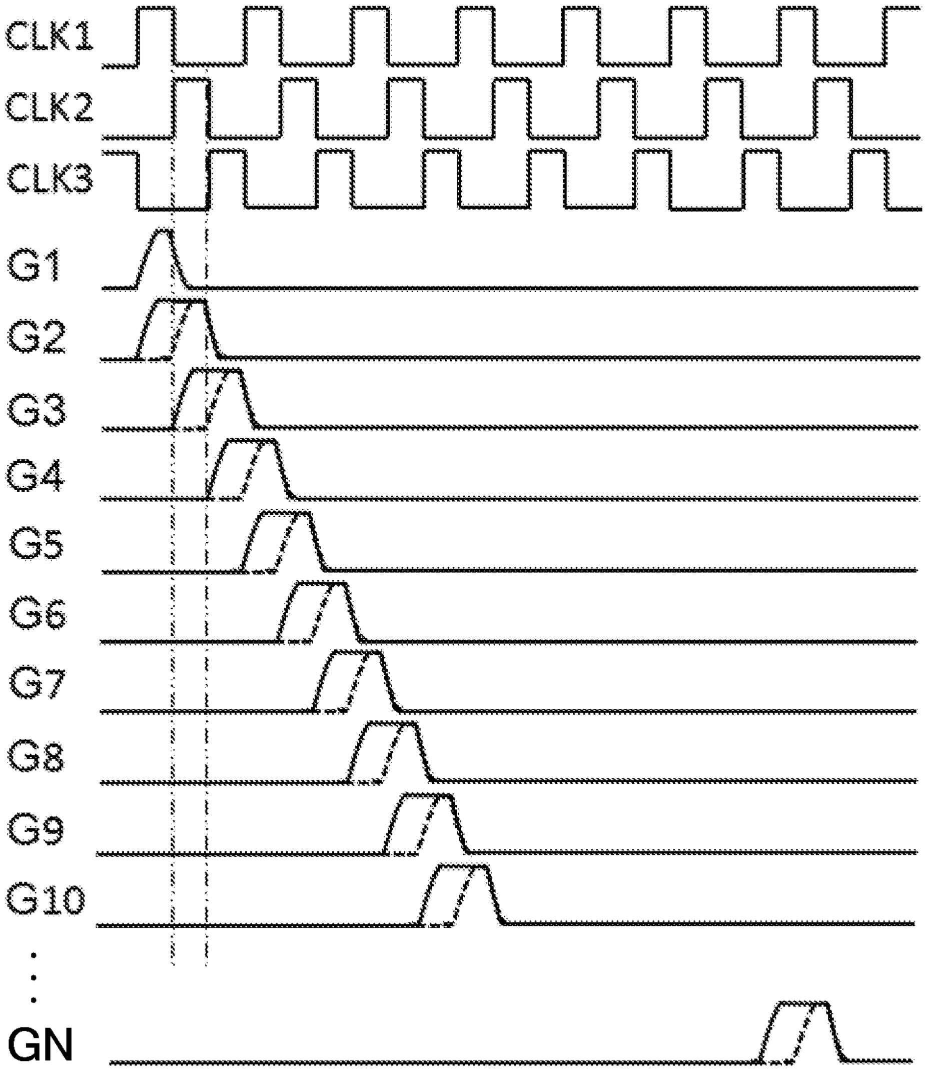
FIG. 6 is a schematic diagram showing waveforms of starting signals outputted from scan lines and a drive signal according to another embodiment of the present disclosure.

In particular, as shown in FIG. 6, there is a phase difference of 120 degrees between any two of the drive signal CLK1 supplied by the first clock signal supply terminal 21, the drive signal CLK2 supplied by the second clock signal supply terminal 22 and the drive signal CLK3 supplied by the third clock signal supply terminal 23. For example, when the drive signal CLK1 supplied by the first clock signal supply terminal is a first level, each of the drive signal CLK2 supplied by the second clock signal supply terminal and the drive signal CLK3 supplied by the third clock signal supply terminal will be a second level; when the drive signal CLK2 supplied by the second clock signal supply terminal is the first level, each of the drive signal CLK1 supplied by the first clock signal supply terminal and the drive signal CLK3 supplied by the third clock signal supply terminal will be the second level; when the drive signal CLK3 supplied by the third clock signal supply terminal is the first level, each of the drive signal CLK1 supplied by the first clock signal supply terminal and the drive signal CLK2 supplied by the second clock signal supply terminal will be the second level. The first level is opposite to the second level, for example, the first level is a high level while the second level is a low level; or the first level is a low level while the second level is a high level.

In particular, as shown in FIG. 5 and FIG. 6, the first clock signal CLK1 corresponds to the scan activation signal of the $(3m-2)^{th}$ scan lines, the second clock signal CLK2 corresponds to the scan activation signal of the $(3m-1)^{th}$ scan lines and the third clock signal CLK3 corresponds to the scan activation signal of the $(3m)^{th}$ scan lines. When the first scan line G1 outputs the starting signal, the first clock signal supply terminal outputs the signal CLK1 of the high level to turn on the transistor between the first scan line G1 and the second scan line G2 to charge the second scan line G2 in advance, such that the second scan line G2 can output the starting signal in advance. At this time, each of the drive signal CLK2 outputted by the second clock signal supply terminal and the drive signal CLK3 outputted by the third clock signal supply terminal is the low level. It will not interfere with the starting signal outputted by the third scan line G3 and the starting signal outputted by the fourth scan line G4. As such, when the second scan line G2 normally outputs the starting signal (without considering the portion for charging in advance), the drive signal CLK2 outputted by the second clock signal supply terminal is the high level, to turn on the transistor between the second scan line G2 and the third scan line G3 to charge the third scan line G3 in advance such that the third scan line G3 outputs the starting signal in advance, and so forth. Thus, the scan lines G2 to GN can output the starting signal in advance.

Figure 7:
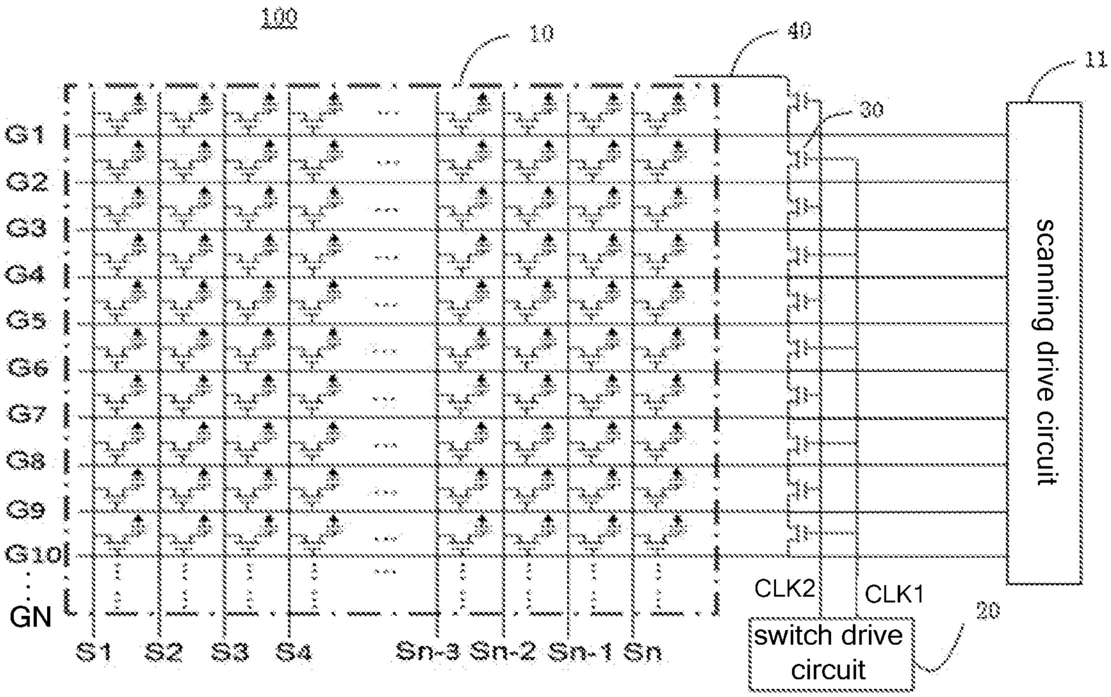
FIG. 7 is a schematic view showing a structure of an array substrate according to another embodiment of the present disclosure.

In an embodiment of the present disclosure, it may also compensate the time of the starting signal outputted by the first scan line of the N scan lines. For example, in an example, a dummy gate signal line 40 may be arranged in the array substrate. The dummy gate signal line 40 may be configured to apply a voltage to a first scan line of the N scan lines before the scan activation signal of the first scan line is supplied, so as to achieve charging in advance. As an example, as illustrated in FIG. 7, the dummy gate signal line 40 is connected to the first scan line by an additional switch. The switch drive circuit 20 may be configured to switch on the additional switch before the scan activation signal of the first scan line is triggered, so as to apply a voltage to the first scan line in advance and charge the first scan line G1. As an example, the dummy gate signal line 40 may be arranged at any positions on the array substrate without interfering with other elements working, for example, may be arranged at a periphery of the array substrate. In FIG. 7, the dummy gate signal line 40 may for example be arranged in an upper portion or a lower portion of the array substrate 100 (only indicating the orientations in FIG. 7), or may be arranged at a tail end of the first scan line, and so on.

Figure 8:
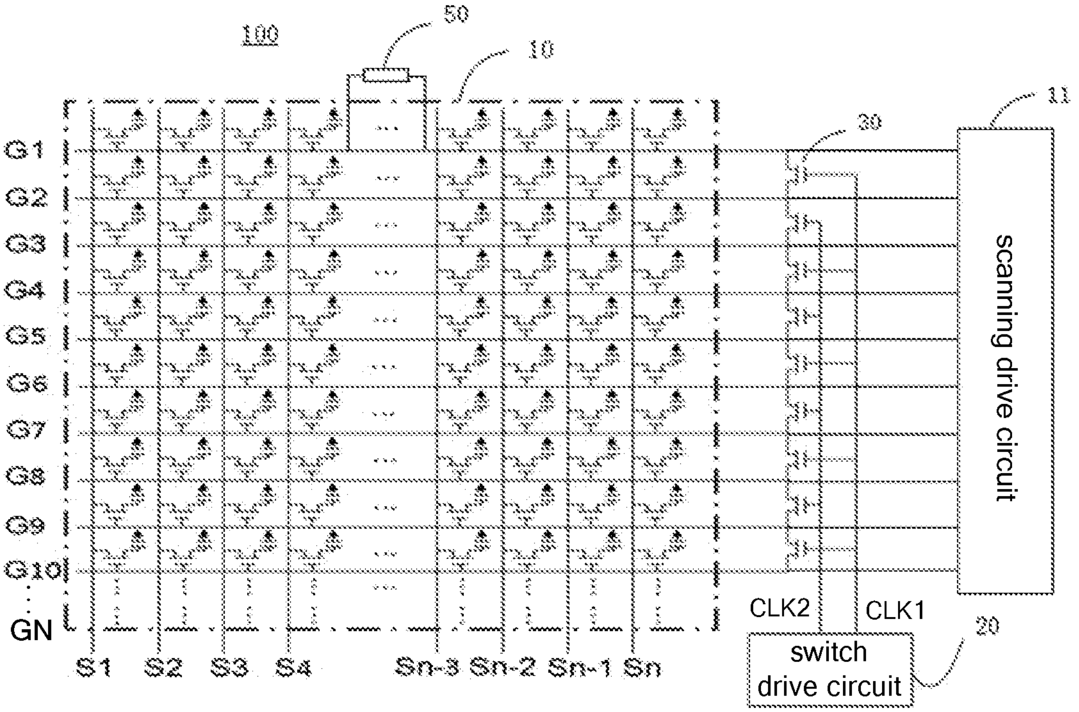
FIG. 8 is a schematic view showing a structure of an array substrate according to another embodiment of the present disclosure.

In another example, as shown in FIG. 8, a compensation resistor 50 connected in parallel to the first scan line of the N scan lines may also be arranged on the array substrate, to reduce the loads of the first scan line G1 and delay of the first scan line G1.

As discussed above, in the array substrate according to the embodiment of the present disclosure, when the $i^{th}$ scan line receives the scan activation signal, the drive signal is supplied to the transistor between the $i^{th}$ scan line and the $(i+1)^{th}$ scan line, to turn on the switch between the $i^{th}$ scan line and the $(i+1)^{th}$ scan line such that the $i^{th}$ scan line is in electrical communication with the $(i+1)^{th}$ scan line. It causes the $(i+1)^{th}$ scan line to output the starting signal in advance. In this way, it can reduce influence of the scan line delay on the charging time of the display panel, to avoid the abnormal display due to insufficient charging time.

Figure 9:
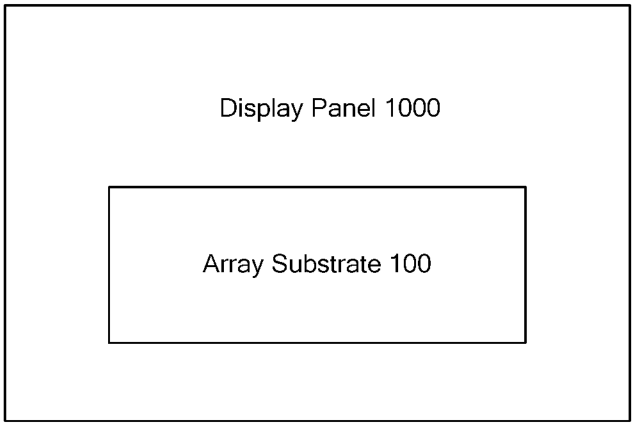
FIG. 9 is a block diagram of a display panel according to an embodiment of the present disclosure.

FIG. 9 is a block diagram of a display panel according to an embodiment of the present disclosure. As illustrated in FIG. 9, the display panel 1000 includes the array substrate 100 according to the above embodiment of the present disclosure.

The display panel according to the embodiment of the present disclosure using the above array substrate, can cause the scan lines to output the starting signal in advance. It is helpful to reduce the influence of the scan line delay on the charging time and solve the problem of abnormal display due to insufficient charging time.

Figure 10:
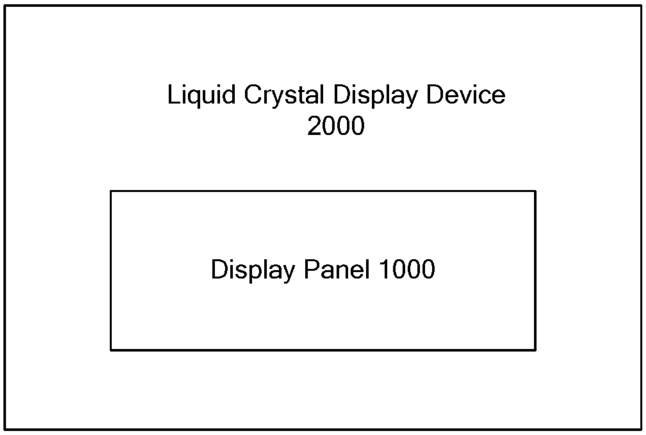
FIG. 10 is a block diagram of a liquid crystal display device according to an embodiment of the present disclosure.

FIG. 10 is a block diagram of a liquid crystal display device according to an embodiment of the present disclosure. As illustrated in FIG. 10, the liquid crystal display device 2000 includes the display panel 1000 according to the above embodiment of the present disclosure.

The display device according to the embodiment of the present disclosure using the above display panel, can cause the scan lines to output the starting signal in advance. It is helpful to reduce the influence of the scan line delay on the charging time and solve the problem of abnormal display due to insufficient charging time.

Figure 11:
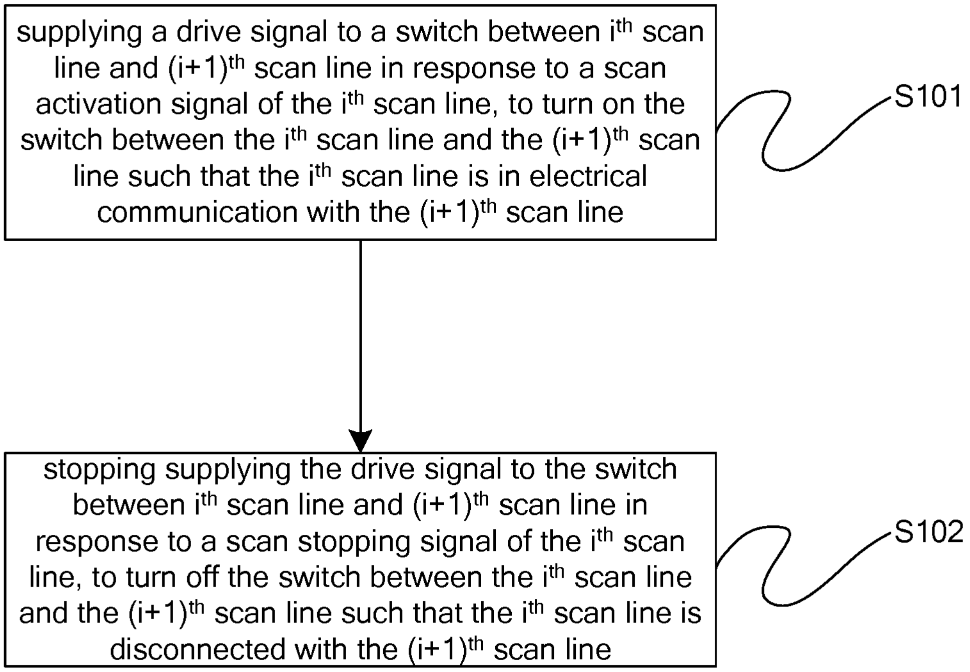
FIG. 11 is an exemplified flow chart of a method for driving the display panel according to an embodiment of the present disclosure.

FIG. 11 is a flow chart of a method for driving the display panel according to the embodiment of the present disclosure. As illustrated in FIG. 11, the method includes the following steps:

S101: supplying a drive signal to a switch between $i^{th}$ scan line and $(i+1)^{th}$ scan line in response to a scan activation signal of the $i^{th}$ scan line, to turn on the switch between the $i^{th}$ scan line and the $(i+1)^{th}$ scan line such that the $i^{th}$ scan line is in electrical communication with the $(i+1)^{th}$ scan line, where $i=1, 2, 3, \ldots, N-1$.

As an example, the method may further include the step S102: stopping supplying the drive signal to the switch between $i^{th}$ scan line and $(i+1)^{th}$ scan line in response to a scan stopping signal of the $i^{th}$ scan line, to turn off the switch between the $i^{th}$ scan line and the $(i+1)^{th}$ scan line such that the $i^{th}$ scan line is disconnected with the $(i+1)^{th}$ scan line.

In particular, as seen in FIG. 2, one transistor is arranged between each adjacent two scan lines in the N scan lines G1 to GN. When the $i^{th}$ scan line outputs the starting signal, the drive signal is supplied to the transistor between the $i^{th}$ scan line and the $(i+1)^{th}$ scan line. By means of turning on the transistor between the $i^{th}$ scan line and the $(i+1)^{th}$ scan line, the $(i+1)^{th}$ scan line outputs the starting signal in advance.

Thus, the method can cause the scan lines to output the starting signal in advance. It is helpful to reduce the influence of the scan line delay on the charging time of the display panel, so as to avoid abnormal display of the display panel due to insufficient charging time.

In an embodiment of the present disclosure, the drive signal is supplied by the first clock signal supply terminal and the second clock signal supply terminal. The first clock signal supply terminal is electrically connected with a drive terminal of the switch between $k^{th}$ scan line and $(k+1)^{th}$ scan line, and the second clock signal supply terminal is electrically connected with a drive terminal of the switch between $j^{th}$ scan line and $(j+1)^{th}$ scan line, where k is an odd number greater than or equal to 1 but less than N, and j is an even number greater than 1 but less than or equal to N. As an example, the above step S101 may further include: supplying a drive signal to the drive terminal of the switch between the $k^{th}$ scan line and the $(k+1)^{th}$ scan line from the first clock signal supply terminal in response to the scan activation signal of the $k^{th}$ scan line such that the $k^{th}$ scan line is in electrical communication with the $(k+1)^{th}$ scan line; and supplying a drive signal to the drive terminal of the switch between the $j^{th}$ scan line and the $(j+1)^{th}$ scan line from the second clock signal supply terminal in response to the scan activation signal of the $j^{th}$ scan line such that the $j^{th}$ scan line is in electrical communication with the $(j+1)^{th}$ scan line.

Specifically, the drive signal CLK1 supplied by the first clock signal supply terminal and the drive signal CLK2 supplied by the second clock signal supply terminal are out of phase. On other words, when the drive signal CLK1 supplied by the first clock signal supply terminal is a first level, the drive signal CLK2 supplied by the second clock signal supply terminal will be a second level. Or, when the drive signal CLK1 supplied by the first clock signal supply terminal is the second level, the drive signal CLK2 supplied by the second clock signal supply terminal will be the first level.

In another embodiment of the present disclosure, the drive signal may also be supplied by the first clock signal supply terminal, the second clock signal supply terminal and the third clock signal supply terminal. The first clock signal supply terminal is electrically connected with a drive terminal of the switch between $(3p+1)^{th}$ scan line and $(3p+2)^{th}$ scan line. The second clock signal supply terminal is electrically connected with a drive terminal of the switch between $(3q+2)^{th}$ scan line and $(3q+3)^{th}$ scan line. The third clock signal supply terminal is electrically connected with a drive terminal of the switch between $(3r+3)^{th}$ scan line and $(3r+4)^{th}$ scan line. In the above embodiment, p, q and r are integers greater than or equal to zero and meet: $3p+2 \leq N$, $3q+3 \leq N$, and $3r+4 \leq N$.

As an example, the above step S101 may further include: supplying a drive signal to the drive terminal of the switch between the $(3p+1)^{th}$ scan line and the $(3p+2)^{th}$ scan line from the first clock signal supply terminal in response to the scan activation signal of the $(3p+1)^{th}$ scan line such that the $(3p+1)^{th}$ scan line is in electrical communication with the $(3p+2)^{th}$ scan line; supplying a drive signal to the drive terminal of the switch between the $(3q+2)^{th}$ scan line and the $(3q+3)^{th}$ scan line from the second clock signal supply terminal in response to the scan activation signal of the $(3q+2)^{th}$ scan line such that the $(3q+2)^{th}$ scan line is in electrical communication with the $(3q+3)^{th}$ scan line; and supplying a drive signal to the drive terminal of the switch between the $(3r+3)^{th}$ scan line and the $(3r+4)^{th}$ scan line from the third clock signal supply terminal in response to the scan activation signal of the $(3r+3)^{th}$ scan line such that the $(3r+3)^{th}$ scan line is in electrical communication with the $(3r+4)^{th}$ scan line.

It should be noted that the above arrangements of drive signals only can compensate the time of the starting signal outputted by the N−1 scan lines in the N scan lines other than the first scan line, that is, outputs the starting signal in advance.

Thus, in some embodiments of the present disclosure, the starting signal outputted by the first scan line may also be compensated. In particular, any one of the following modes can be used to compensate the time of the starting signal outputted by the first scan line in the N scan lines:

(1) for example, the dummy gate signal line may be arranged on both sides (for example, at least one of the upper side and the lower side of the dashed block shown in FIG. 2) of the region of the array substrate 100 on which the scan lines are arranged, and the signal which is outputted at first by the dummy gate signal line is regarded as the scan activation signal for the first scan line;

(2) a resistor connected in parallel with the first scan line is arranged around the array substrate 100 to reduce loads of the first scan line G1 and delay of the first scan line G1;

(3) the dummy gate signal line may be arranged at a tail end of the first scan line and the signal outputted by the dummy gate signal line acts as the scan activation signal for the first scan line to charge the first scan line in advance.

In the method for driving the display panel according to the embodiment of the present disclosure, in response to the scan activation signal of the $i^{th}$ scan line, the drive signal is supplied to the transistor between the $i^{th}$ scan line and the $(i+1)^{th}$ scan line, to turn on the switch between the $i^{th}$ scan line and the $(i+1)^{th}$ scan line such that the $i^{th}$ scan line is in electrical communication with the $(i+1)^{th}$ scan line. In this way, the starting signal may be outputted by the $(i+1)^{th}$ scan line in advance. Thus, it can reduce influence of the scan line delay on the charging time of the display panel, to avoid the abnormal display of the display panel due to insufficient charging time.

Although the above embodiments of the present application have been explained by taking the transistors as example of the switch, it should be understood that the switch in the embodiments are not limited to the transistor, but the transistor can be replaced by other known switches (such as a thyristor) in the art as long as they can achieve communication or disconnection between adjacent scan lines under control of the drive signal.

In the description of the present disclosure, phrases such as "an embodiment", "some embodiments", "an example", "exemplified example" or "some examples" mean that the specific features, structures, materials or characteristics described in the embodiments or the examples are incorporated into at least one embodiments or examples of the present disclosure. In the present description, the above expressions are not intended necessarily to represent the same embodiments or examples. And the specific features, structures, materials or characteristics described in the embodiments or the examples may be combined suitably in any one or more embodiments or examples. Furthermore, the skilled person in the art can combine different embodiments or examples described in the present description and features of different embodiments or examples unless they are contradicted with each other.

In addition, the terms of "first" and "second" are only intended for description, and neither they are intended to represent or imply relative significance nor they are intended to limit number of the following technical features. Thus, the features defined by "first" and "second" can explicitly or impliedly include at least one feature. In the description of the present disclosure, "more" means at least two, for example, two, three, and so on unless defined explicitly otherwise.

Any processes or methods described in flow chart or in the description may be understood as one or more modules, clips or portions of codes of executable instructions for performing steps of customized logical functions or processes. And scopes of the embodiments of the present disclosure include additional implementations in which the shown or discussed orders may not be followed, for example, the functions are achieved by performing steps at substantially same time or in an opposite order. It should be understood by the skilled person in the art.

The logics and/or steps shown in the flow chart or described otherwise herein, for example may be considered as list of sequences of executable instructions for achieving logic functions, may be implemented specifically in any computer readable media, for use of instruction implementation system, apparatus, device (for example, a computer-based system, a system including a processor or other systems for executing instructions, a system that retrieves instructions from the apparatus or device and executes the instructions), or for use of combining these systems, apparatuses or devices for executing the instructions. In the present description, “computer readable medium” may be any devices that may contain, store, communicate, propagate or transport programs to supply systems, devices or apparatuses executing instructions or combine systems, devices or apparatuses executing instructions. More specific examples of the computer readable media (unlimited list) includes: electrical connection portions having one or more wirings (electronic devices), portable computer disc cassettes (magnetic devices), random access memory (RAM), read-only memory (ROM), erasable programmable read-only memory (EPROM or flash memory), fiber devices and compact disk read only memory (CDROM). In addition, the computer readable media may even be the paper on which programs may be printed or other suitable media. It is because the programs may be acquired electronically for example by performing optical scanning on the paper or the other media and editing, compiling the scanned information or if required processing the scanned information in other suitable modes and then the programs may be stored in a computer memory.

It should be understood that all of parts of the present disclosure may be implemented by hardware, software, firmware or their combinations. In the above embodiments, a plurality of steps or processes may be implemented by software or firmware stored in the memory and executed by suitable instruction execution systems. For example, if the embodiments of the present disclosure are implemented by hardware, like other embodiments, they may be implemented by any one of the following technology known in the art or any combination thereof: discrete logic circuit having logic gate circuits for achieving logic functions for the data signals, application specific integrated circuit having suitable combined logic gate circuits, programmable gate array (PGA), field programmable gate array (FPGA), and so on.

The skilled person in the art can understand that all or part of steps carried by the method according to the above embodiments may be implemented by instructing relative hardware by programs. The programs may be stored in a computer readable store medium. When the programs are executed, they include one of the steps of the method according to the above embodiments or any combination thereof.

Furthermore, all of function units in the embodiments of the present disclosure may be integrated in one processing module, or may separate physically. Or two or more units are integrated in one module. The above integrated module may be implemented in form of hardware, or may be implemented in form of software functional modules. The integrated module may also be stored in a computer readable storage medium if the integrated module is implemented in form of software functional modules and sold or used as separate products.

The storage medium mentioned above may be a read-only memory, a magnetic disc or an optical disc, and so on. Although the embodiments of the present disclosure have been shown and described above, it can be understood that the above embodiments are given by way of examples, instead of being intended to limit the present disclosure. The skilled person in the art that the above embodiments may be varied, modified, altered and changed within the scope of the present disclosure.

In the description of the present disclosure, it should be noted that terms of “center”, “longitudinal”, “traverse”, “length”, “width”, “thickness”, “upper”, “lower”, “front”, “behind”, “left”, “right”, “vertical”, “horizontal”, “top”, “bottom”, “inner”, “outer”, “clockwise”, “anti-clockwise”, “axial”, “radial” and “circumferential”, and so on, indicate the orientation or position relation shown in figures. They are intended to explain the present disclosure and simplify the description, instead of indicating or implying that the mentioned devices or elements must have special orientations, be constructed and operate in a special orientation, thus, they are not be understood to limit the present disclosure.

Unless otherwise defined or specified explicitly, in the present disclosure, the terms of “mount”, “connect”, “interconnect”, “fix” and so on should be understood broadly, for example, they may represent fixed connection, or may represent dismountable connection, or may represent integration connection; they may represent mechanical connection, or may represent electrical connection; they may represent direct connection, or may represent indirect connection by intermediate medium, or they may represent internal communication between two elements or interaction between two elements.

The skilled person in the art will appreciate the specific meaning of the above terms in the present disclosure.

In the present disclosure, unless otherwise defined or specified explicitly, the first feature “on” or “under” the second feature may represent direct contact between the first feature and the second feature, or represent indirect contact between the first feature and the second feature by an intermediate medium. And the first feature “above” or “on” the second feature may represent the first feature is located right above the second feature or oblique above the second feature, or only represent the first feature has a higher horizontal height than the second feature. The first feature “below” or “under” the second feature may represent the first feature is located right below the second feature or oblique below the second feature, or only represent the first feature has a lower horizontal height than the second feature.

Although the embodiments of the present disclosure have been shown and described, it should be understood that the above embodiments are exemplified, instead of limiting the present disclosure. Changes, modification, alternations or variation can be made by those skilled in the art to the embodiments without departing the scope of the present disclosure.

What is claimed is:

1. An array substrate, comprising:

N rows of pixel units, N being an integer greater than or equal to 2;

N scan lines, each of the N scan lines corresponding to one of the N rows of pixel units, a switch being connected between two adjacent scan lines of the N scan lines;

a scanning drive circuit configured to supply a scan activation signal to each of the N scan lines to activate a scan operation;

a switch drive circuit configured to supply a drive signal to the switch between $i^{th}$ scan line and $(i+1)^{th}$ scan line in response to emergence of the scan activation signal for the $i^{th}$ scan line, to turn on the switch between the $i^{th}$ scan line and the $(i+1)^{th}$ scan line such that the $i^{th}$ scan line is in electrical communication with the $(i+1)^{th}$ scan line, where i=1, 2, 3, . . . , N−1; and a dummy gate signal line configured to apply a voltage to a first scan line of the N scan lines before the scan activation signal for the first scan line is supplied, wherein the scanning drive circuit is further configured to supply a scan stopping signal to each of the N scan lines to stop the scan operation, and wherein the switch drive circuit is further configured to stop supplying the drive signal to the switch between $i^{th}$ scan line and $(i+1)^{th}$ scan line in response to the scan stopping signal for the $i^{th}$ scan line, to turn off the switch between the $i^{th}$ scan line and the $(i+1)^{th}$ scan line such that the $i^{th}$ scan line is disconnected with the $(i+1)^{th}$ scan line.

2. The array substrate according to claim 1, wherein the switch drive circuit comprises:

a first clock signal supply terminal electrically connected with a drive terminal of the switch between $k^{th}$ scan line and $(k+1)^{th}$ scan line; and a second clock signal supply terminal electrically connected with a drive terminal of the switch between $j^{th}$ scan line and $(j+1)^{th}$ scan line, wherein k is an odd number greater than or equal to 1 but less than N, and j is an even number greater than 1 but less than or equal to N.

3. The array substrate according to claim 2, wherein the first clock signal supply terminal is configured to supply a drive signal to the drive terminal of the switch between the $k^{th}$ scan line and the $(k+1)^{th}$ scan line in response to the scan activation signal for the $k^{th}$ scan line such that the $k^{th}$ scan line is in electrical communication with the $(k+1)^{th}$ scan line, and wherein the second clock signal supply terminal is configured to supply a drive signal to the drive terminal of the switch between the $j^{th}$ scan line and the $(j+1)^{th}$ scan line in response to the scan activation signal for the $j^{th}$ scan line such that the $j^{th}$ scan line is in electrical communication with the $(j+1)^{th}$ scan line.

4. The array substrate according to claim 3, wherein the drive signal supplied by the first clock signal supply terminal and the drive signal supplied by the second clock signal supply terminal are out of phase.

5. The array substrate according to claim 1, wherein one switch is electrically connected between each two adjacent scan lines of the N scan lines.

6. The array substrate according to claim 1, wherein the switch comprises a transistor.

7. The array substrate according to claim 1, further comprising a compensation resistor connected in parallel to a first scan line of the N scan lines.

8. A display panel comprising the array substrate according to claim 1.

9. A liquid crystal display device comprising the display panel according to claim 8.

10. A method for driving a display panel, the display panel comprising the array substrate according to claim 1, the method comprising:

supplying a drive signal to a switch between $i^{th}$ scan line and $(i+1)^{th}$ scan line in response to emergence of a scan activation signal for the $i^{th}$ scan line, to turn on the switch between the $i^{th}$ scan line and the $(i+1)^{th}$ scan line such that the $i^{th}$ scan line is in electrical communication with the $(i+1)^{th}$ scan line, where i=1, 2, 3, . . . , N−1; and stopping supplying the drive signal to the switch between $i^{th}$ scan line and $(i+1)^{th}$ scan line in response to a scan stopping signal for the $i^{th}$ scan line, to turn off the switch between the $i^{th}$ scan line and the $(i+1)^{th}$ scan line such that the $i^{th}$ scan line is disconnected with the $(i+1)^{th}$ scan line.

11. The method according to claim 10, wherein the drive signal is supplied by a first clock signal supply terminal and a second clock signal supply terminal, the first clock signal supply terminal being electrically connected with a drive terminal of the switch between $k^{th}$ scan line and $(k+1)^{th}$ scan line, and the second clock signal supply terminal being electrically connected with a drive terminal of the switch between $j^{th}$ scan line and $(j+1)^{th}$ scan line, wherein k is an odd number greater than or equal to 1 but less than N, and j is an even number greater than 1 but less than or equal to N.

12. The method according to claim 11, wherein the supplying the drive signal to the switch between $i^{th}$ scan line and $(i+1)^{th}$ scan line in response to the scan activation signal for the $i^{th}$ scan line comprises:

supplying a drive signal to the drive terminal of the switch between the $k^{th}$ scan line and the $(k+1)^{th}$ scan line from the first clock signal supply terminal in response to the scan activation signal for the $k^{th}$ scan line such that the $k^{th}$ scan line is in electrical communication with the $(k+1)^{th}$ scan line, and supplying a drive signal to the drive terminal of the switch between the $j^{th}$ scan line and the $(j+1)^{th}$ scan line from the second clock signal supply terminal in response to the scan activation signal for the $j^{th}$ scan line such that the $j^{th}$ scan line is in electrical communication with the $(j+1)^{th}$ scan line.

13. The method according to claim 10, wherein the drive signal is supplied by a first clock signal supply terminal, a second clock signal supply terminal and a third clock signal supply terminal, and wherein the first clock signal supply terminal is electrically connected with a drive terminal of the switch between $(3p+1)^{th}$ scan line and $(3p+2)^{th}$ scan line;

wherein the second clock signal supply terminal is electrically connected with a drive terminal of the switch between $(3q+2)^{th}$ scan line and $(3q+3)^{th}$ scan line; and wherein the third clock signal supply terminal is electrically connected with a drive terminal of the switch between $(3r+3)^{th}$ scan line and $(3r+4)^{th}$ scan line, wherein p, q and r are integers greater than or equal to zero and meet:

$$3p+2 \le N,$$

$$3q+3 \le N, \text{ and}$$

$$3r+4 \le N.$$

14. The method according to claim 13, wherein the supplying the drive signal to the switch between $i^{th}$ scan line and $(i+1)^{th}$ scan line in response to the scan activation signal for the $i^{th}$ scan line comprises:

supplying a drive signal to the drive terminal of the switch between the $(3p+1)^{th}$ scan line and the $(3p+2)^{th}$ scan line from the first clock signal supply terminal in response to the scan activation signal for the $(3p+1)^{th}$ scan line such that the $(3p+1)^{th}$ scan line is in electrical communication with the $(3p+2)^{th}$ scan line, supplying a drive signal to the drive terminal of the switch between the $(3q+2)^{th}$ scan line and the $(3q+3)^{th}$ scan line from the second clock signal supply terminal in response to the scan activation signal for the $(3q+2)^{th}$ scan line such that the $(3q+2)^{th}$ scan line is in electrical communication with the $(3q+3)^{th}$ scan line, and supplying a drive signal to the drive terminal of the switch between the $(3r+3)^{th}$ scan line and the $(3r+4)^{th}$ scan line from the third clock signal supply terminal in response to the scan activation signal for the $(3r+3)^{th}$ scan line such that the $(3r+3)^{th}$ scan line is in electrical communication with the $(3r+4)^{th}$ scan line.

15. An array substrate, comprising:

N rows of pixel units, N being an integer greater than or equal to 2;

N scan lines, each of the N scan lines corresponding to one of the N rows of pixel units, a switch being connected between two adjacent scan lines of the N scan lines;

a scanning drive circuit configured to supply a scan activation signal to each of the N scan lines to activate a scan operation;

a switch drive circuit configured to supply a drive signal to the switch between $i^{th}$ scan line and $(i+1)^{th}$ scan line in response to emergence of the scan activation signal for the $i^{th}$ scan line, to turn on the switch between the $i^{th}$ scan line and the $(i+1)^{th}$ scan line such that the $i^{th}$ scan line is in electrical communication with the $(i+1)^{th}$ scan line, where i=1, 2, 3, . . . , N−1, wherein the switch drive circuit comprises:

a first clock signal supply terminal electrically connected with a drive terminal of the switch between $(3p+1)^{th}$ scan line and $(3p+2)^{th}$ scan line;

a second clock signal supply terminal electrically connected with a drive terminal of the switch between $(3q+2)^{th}$ scan line and $(3q+3)^{th}$ scan line; and a third clock signal supply terminal electrically connected with a drive terminal of the switch between $(3r+3)^{th}$ scan line and $(3r+4)^{th}$ scan line, as long as p, q and r are integers greater than or equal to zero and meet:

$$3p+2 \le N,$$

$$3q+3 \le N, \text{ and}$$

$$3r+4 \le N.$$

16. The array substrate according to claim 15, wherein the first clock signal supply terminal is configured to supply a drive signal to the drive terminal of the switch between the $(3p+1)^{th}$ scan line and the $(3p+2)^{th}$ scan line in response to the scan activation signal for the $(3p+1)^{th}$ scan line such that the $(3p+1)^{th}$ scan line is in electrical communication with the $(3p+2)^{th}$ scan line, wherein the second clock signal supply terminal is configured to supply a drive signal to the drive terminal of the switch between the $(3q+2)^{th}$ scan line and the $(3q+3)^{th}$ scan line in response to the scan activation signal for the $(3q+2)^{th}$ scan line such that the $(3q+2)^{th}$ scan line is in electrical communication with the $(3q+3)^{th}$ scan line, and wherein the third clock signal supply terminal is configured to supply a drive signal to the drive terminal of the switch between the $(3r+3)^{th}$ scan line and the $(3r+4)^{th}$ scan line in response to the scan activation signal for the $(3r+3)^{th}$ scan line such that the $(3r+3)^{th}$ scan line is in electrical communication with the $(3r+4)^{th}$ scan line.

17. The array substrate according to claim 16, wherein there is a phase difference of 120 degrees between the drive signal supplied by the first clock signal supply terminal and the drive signal supplied by the second clock signal supply terminal, and there is a phase difference of 120 degrees between the drive signal supplied by the second clock signal supply terminal and the drive signal supplied by the third clock signal supply terminal.

* * * * *